No. 766,493. Patented August 2, 1904.

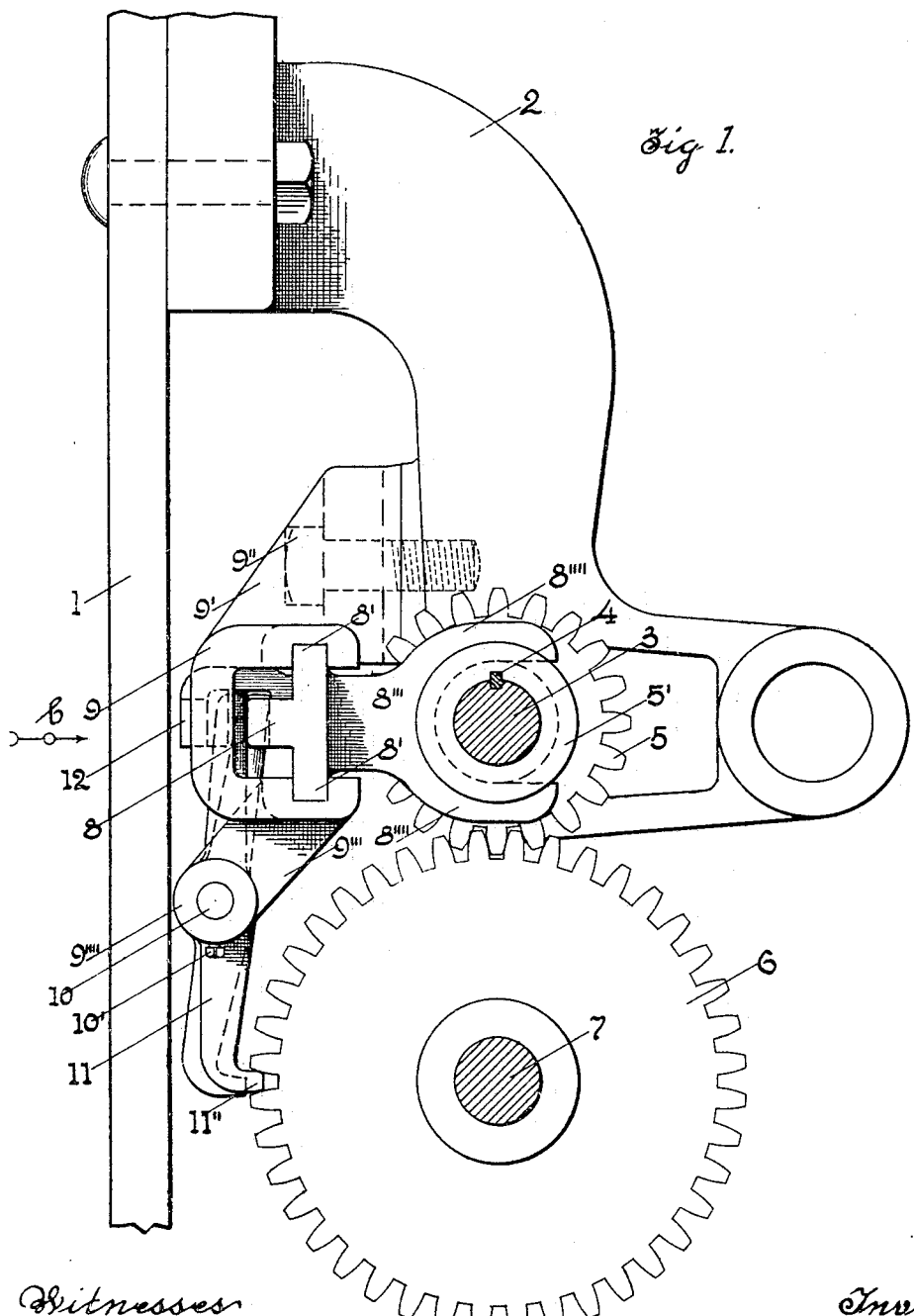

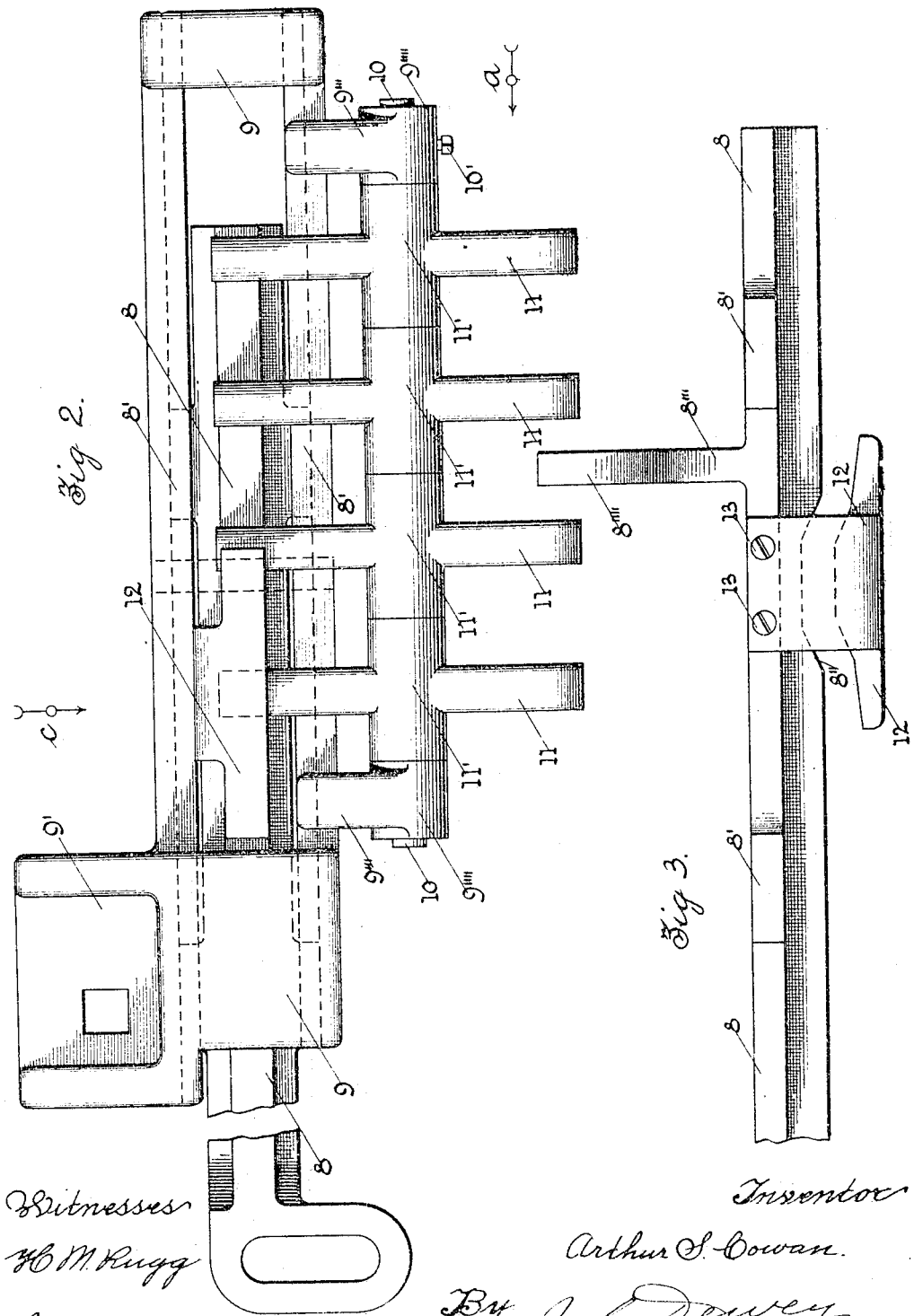

UNITED STATES PATENT OFFICE.

ARTHUR S. COWAN, OF WORCESTER, MASSACHUSETTS, ASSIGNOR TO CROMPTON & KNOWLES LOOM WORKS, A CORPORATION OF MASSACHUSETTS.

GEAR-LOCKING DEVICE.

SPECIFICATION forming part of Letters Patent No. 766,493, dated August 2, 1904.

Application filed May 4, 1904. Serial No. 206,318. (No model.)

*To all whom it may concern:*

Be it known that I, ARTHUR S. COWAN, a citizen of the United States, residing at Worcester, in the county of Worcester and State of Massachusetts, have invented certain new and useful Improvements in Gear-Locking Devices, of which the following is a specification.

My invention relates to mechanism for locking or holding in position a series of operating-gears mounted on a shaft and adapted to be operated separately by a pinion on an intermittently-driven shaft, so as to have the teeth on the gears in alinement with the teeth on the pinion to allow the pinion to be moved into mesh therewith.

The object of my invention is to provide a simple and efficient mechanism for the purpose stated; and my invention consists in certain novel features of construction of my improvements, as will be hereinafter fully described.

My improvements are intended particularly to be used in connection with the shuttle motion of a narrow-ware loom to operate different sets of shuttles by the rotation of the different gears of a series of gears; but they may be used in connection with any other mechanism.

Referring to the drawings, Figure 1 is an end view of my improvements looking in the direction of arrow *a*, Fig. 2, and showing a stand for supporting the same and a driven shaft and the shaft for the gears to be operated with a driving-pinion and one gear mounted on said shafts. Fig. 2 is a front view of my improvements detached, showing four locks or pawls and a sliding bar with cam attachment to operate the same, looking in the direction of arrow *b*, Fig. 1. The supporting-stand, the driving-pinion, and the gears with their shafts are not shown in this figure; and Fig. 3 is a plan view of a portion of the sliding bar shown in Fig. 2 detached looking in the direction of arrow *c*, same figure.

In the accompanying drawings, 1 is a frame or support. 2 is a bracket or stand bolted thereto and having bearings thereon for the driven shaft 3, which in this instance has a feather 4 thereon and has an intermittent rotary motion communicated thereto. 5 is a driving-pinion mounted on the shaft 3, in this instance to slide thereon and to rotate therewith through the feather 4. The pinion 5 is adapted to mesh with any one of a series of operating-gears, only one of which, 6, is shown in the drawings, in this instance loosely mounted on a shaft 7, which is suitably supported and extends in this instance below the driven shaft 3.

A bar 8 is mounted and adapted to slide in recesses or grooves in a stand 9, and said bar 8 has extensions 8' on its upper and lower edge, which extend into said grooves or recesses. The stand 9 has an extension 9' at one end thereof, which is secured in this instance by a bolt 9'' to the bracket 2.

Extending down from the stand 9 are arms 9''', having bearings 9'''' at their lower end for the shaft 10, which is held in this instance by a set-screw 10'. Loosely mounted on the shaft 10 are the hubs 11' of four locks or pawls 11. The lower end of each lock 11 has a tapering projection 11'' thereon, adapted to enter between the teeth on the gear 6, as shown in Fig. 1. The tapering projection 11'' on the lock or pawl 11 in entering between the teeth on the gear 6 acts to position the gear in case the pinion 5 does not leave the gear in proper alinement when it is moved out of engagement with said gear, as well as to lock and hold said gear. The upper ends of the locks 11 extend in the path of and are adapted to be engaged by a cam 12, which in this instance is attached to the upper edge of the sliding bar 8 by screws 13. A corresponding cam-recess 8'' (see Fig. 3) is made in the sliding bar 8.

Extending out from the front face of the sliding bar 8 is an arm 8''', having a forked or yoke-shaped end 8'''' thereon, which is adapted to extend into an annular groove in the hub 5' of the pinion 5.

The operation of my improvements will be readily understood by those skilled in the art.

The bar 8 is moved at predetermined intervals by suitable means. (Not shown.)

The pinion 5 will have a sliding motion on the intermittently-driven shaft 3 with said bar 8 when the shaft 3 is not rotating and will be moved into a position to engage with one of the series of operating-gears 6, and each of the locks 11 will be held in engagement with the teeth of the gears 6 to lock them and prevent their turning, until in the movement of the bar 8 the cam 12 engages the upper end of one of said locks 11 (as the one at the left in Fig. 2) and positively moves the lower end of said lock out of engagement with the gear 6, as shown in Fig. 1, leaving said gear free to be rotated by the pinion 5, while the other gears are prevented from rotating and held in a locked position by the other three locks 11.

It will be understood that the gears 6 are connected with some parts which it is desired to operate and that two or more gears and their locks 11 may be used, as desired.

It will be understood that the details of construction of my improvements may be varied, if desired.

Having thus described my invention, what I claim as new, and desire to secure by Letters Patent, is—

1. In mechanism of the class described, the combination with a series of gears a pinion, adapted to be moved into engagement with and operate any one of said series of gears, of a series of locks to position and lock said gears, and means connected with and adapted to move said pinion, and also means adapted to move said locks, substantially as shown and described.

2. In mechanism of the class described, the combination with a pinion adapted to be moved into engagement with and operate any one of a series of gears, and said gears, of a series of locks adapted to engage with and be disengaged from said gears, and a sliding bar connected with and adapted to move said pinion out of engagement with one of said gears, and into engagement with another of said gears, and also adapted to move said locks into and out of engagement with their respective gears, to lock and unlock the same, substantially as shown and described.

A. S. COWAN.

Witnesses:
John C. Dewey,
M. Haas.